Oct. 23, 1928.

M. M. CLAYTON 1,688,853

OUTLET BOX CONNECTION

Filed Aug. 14, 1926

Patented Oct. 23, 1928.

1,688,853

UNITED STATES PATENT OFFICE.

MARTIN M. CLAYTON, OF BADEN, PENNSYLVANIA, ASSIGNOR TO NATIONAL METAL MOLDING COMPANY, A CORPORATION OF PENNSYLVANIA.

OUTLET-BOX CONNECTION.